United States Patent
Forenza et al.

(10) Patent No.: US 12,464,408 B2
(45) Date of Patent: Nov. 4, 2025

(54) NRT RIC ARCHITECTURE SUPPORTING FCAPS AND CLOUD ORCHESTRATION

(71) Applicant: Rakuten Symphony, Inc., Tokyo (JP)

(72) Inventors: Antonio Forenza, San Mateo, CA (US); Ankur Chauhan, Bangalore (IN); Kexuan Sun, Surrey (GB)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/017,153

(22) PCT Filed: Dec. 1, 2022

(86) PCT No.: PCT/US2022/051507
§ 371 (c)(1),
(2) Date: Jan. 20, 2023

(87) PCT Pub. No.: WO2024/081007
PCT Pub. Date: Apr. 18, 2024

(65) Prior Publication Data
US 2024/0251292 A1    Jul. 25, 2024

(51) Int. Cl.
*H04W 28/08* (2023.01)
*H04L 41/0894* (2022.01)
*H04L 41/16* (2022.01)

(52) U.S. Cl.
CPC ..... *H04W 28/0925* (2020.05); *H04L 41/0894* (2022.05); *H04L 41/16* (2013.01); *H04W 28/0958* (2020.05)

(58) Field of Classification Search
CPC .......... H04W 28/0925; H04W 28/0958; H04L 41/0894; H04L 41/16
See application file for complete search history.

(56) References Cited

U.S. PATENT DOCUMENTS

| | | | |
|---|---|---|---|
| 6,801,508 B1 | 10/2004 | Lim | |
| 2021/0235473 A1* | 7/2021 | Parekh | ................ H04W 72/542 |
| 2021/0385686 A1 | 12/2021 | Ahmed et al. | |
| 2022/0256359 A1 | 8/2022 | Awoniyi-Oteri et al. | |

FOREIGN PATENT DOCUMENTS

EP    3869847 A1 *  8/2021  ............ H04W 16/02

OTHER PUBLICATIONS

Written Opinion dated Apr. 12, 2023 issued by the International Searching Authority in application No. PCT/US22/51507.
International Search Report dated Apr. 12, 2023 issued by the International Searching Authority in application No. PCT/US22/51507.

* cited by examiner

*Primary Examiner* — Samina F Choudhry
(74) *Attorney, Agent, or Firm* — Sughrue Mion, PLLC (57) ABSTRACT

A method, performed by a non-real-time (NRT) radio access network (RAN) Intelligent Controller (RIC) within a Service Management and Orchestration (SMO) framework of an open-RAN (O-RAN) network, includes obtaining, by the NRT RIC, fault, configuration, accounting, performance and security (FCAPS) related information via an O1 connection from at least one network element (NE) in the O-RAN network, and implementing, by the NRT RIC, at least one first FCAPS related operation corresponding to the FCAPS related information for the at least one NE via the O1 connection, where the O1 connection includes an interface between the at least one NE and an O1 termination of the NRT RIC.

20 Claims, 10 Drawing Sheets

NRT RIC ARCHITECTURE SUPPORTING FCAPS AND CLOUD ORCHESTRATION

CROSS-REFERENCE TO RELATED APPLICATION(S)

This application is National Stage of International Application No. PCT/US2022/051507 filed Dec. 1, 2022, based on and claims priority to Indian Patent application No. 202241058574, filed on Oct. 13, 2022 in the Indian Patent Office, the disclosure of which is incorporated herein by reference in its entirety.

BACKGROUND

1. Field

Apparatuses and methods consistent with example embodiments of the present disclosure relate to implementing a policy for network elements.

2. Description of Related Art

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

Figure 1:
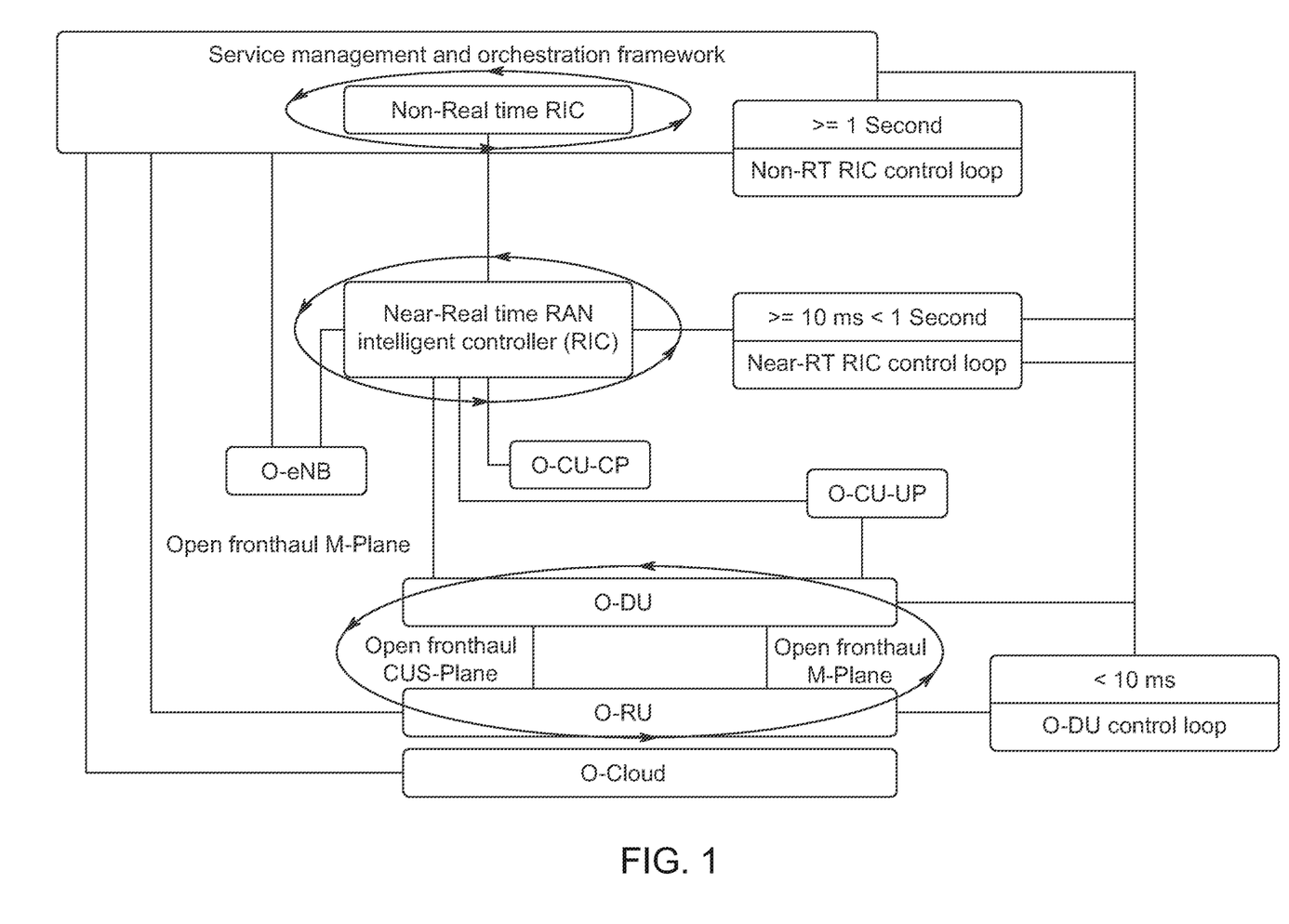
FIG. 1 is a diagram of an open radio access network (O-RAN) architecture according to related art.
Figure 2:
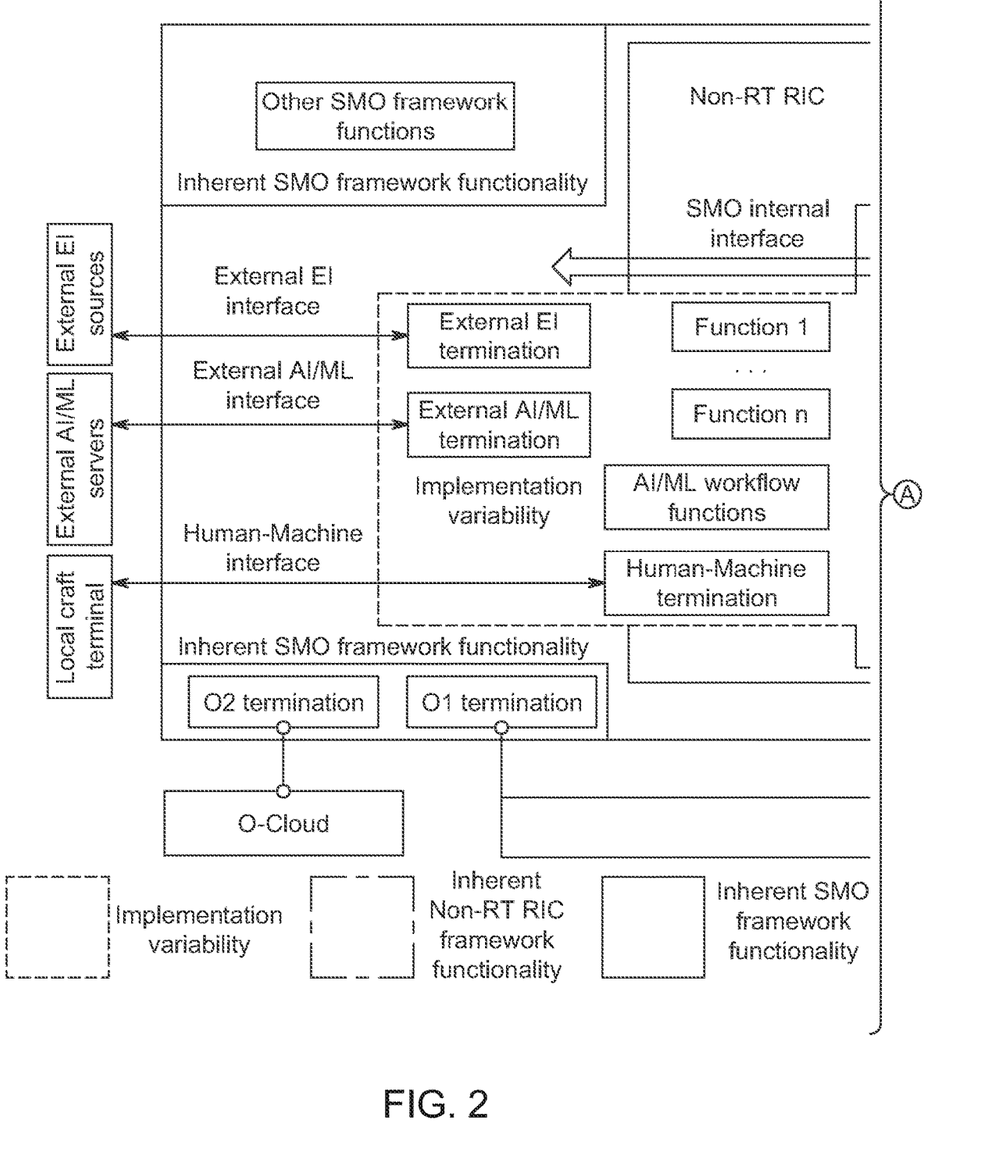
FIG. 2 is a diagram of a Service Management and Orchestration (SMO) framework with a non-real-time (NRT) RAN Intelligent Controller (RIC) architecture in a functional view according to related art.
Figure 3:
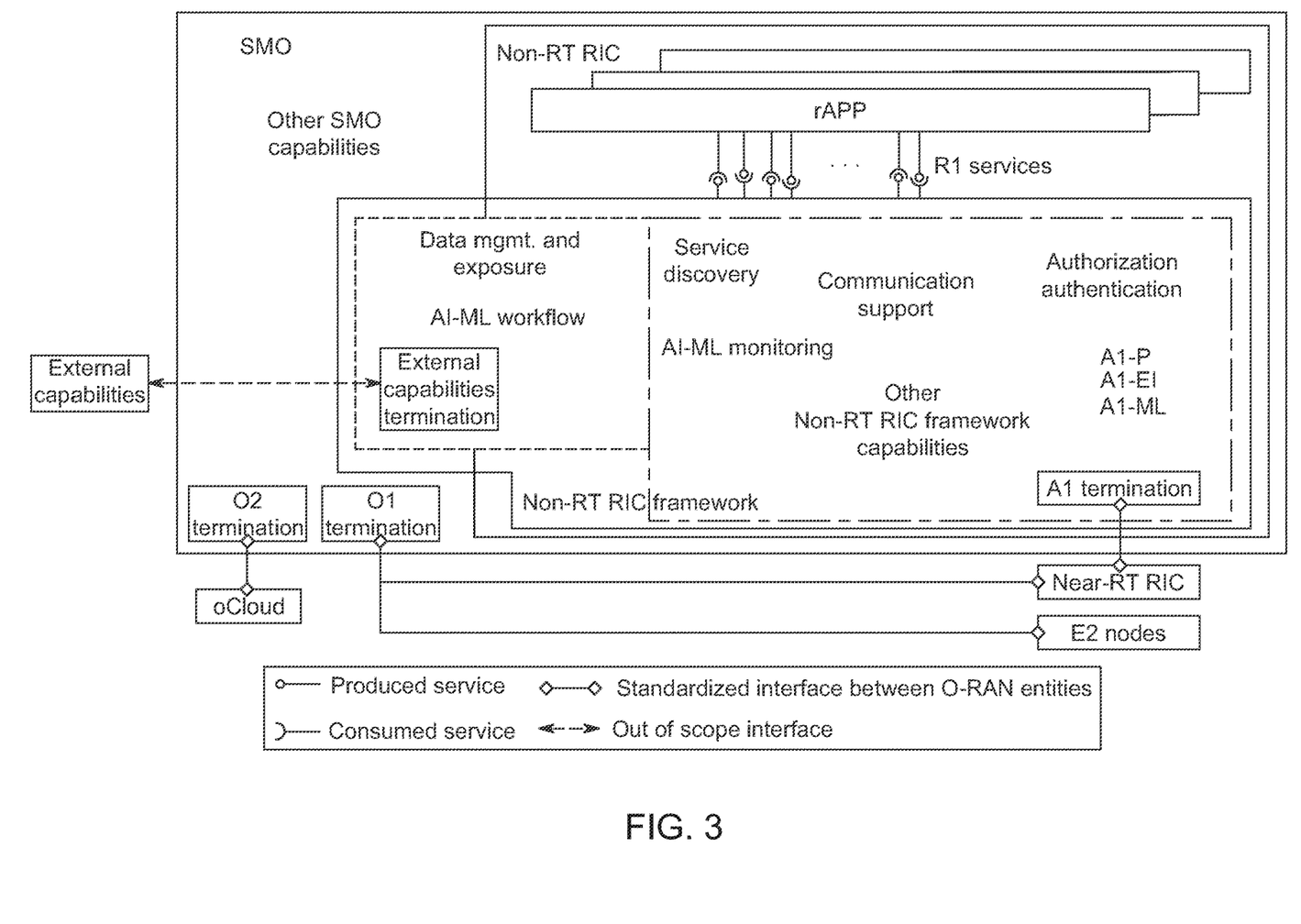
FIG. 3 is a diagram of a related art SMO framework with an NRT RIC in a services view according to related art.

FIG. 1 is a diagram of a related art O-RAN architecture, FIG. 2 is a diagram of a related art Service Management and Orchestration (SMO) framework with a non-real-time (NRT) RAN Intelligent Controller (RIC) architecture in a functional view, and FIG. 3 is a diagram of a related art SMO framework with an NRT RIC in a services view. Referring to FIGS. 1-3, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: an NRT RIC and a near-real-time RIC (nRT RIC).

The NRT RIC is the control point of a non-real-time control loop and operates on a timescale greater than 1 second within the SMO framework. Its functionalities are implemented through modular applications called rApps (rApp 1, . . . , rApp N in FIGS. 1-3), and include: providing policy based guidance and enrichment across the A1 interface, which is the interface that enables communication between the NRT RIC and the nRT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., nRT RIC, O-RAN Centralized Unit (O-CU), O-RAN Distributed Unit (O-DU), etc.).

The nRT RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The nRT RIC uses the E2 interface to control the underlying RAN elements (E2 nodes/network functions (NFs)) over a near-real-time control loop. The nRT RIC monitors, suspends/stops, overrides, and controls the E2 nodes (O-CU, O-DU, and O-eNB) via policies. For example, the nRT sets policy parameters on activated functions of the E2 nodes. Further, the nRT RIC hosts xApps to implement functions such as quality of service (QOS) optimization, mobility optimization, slicing optimization, interference mitigation, load balancing, security, etc. The two types of RICs work together to optimize the O-RAN. For example, the NRT RIC provides, over the A1 interface, the policies, data, and artificial intelligence (AI)/machine learning (ML) models enforced and used by the nRT RIC for RAN optimization, and the nRT returns policy feedback (i.e., how the policy set by the NRT RIC works).

The SMO framework, within which the NRT RIC is located, manages and orchestrates RAN elements. Specifically, the SMO manages and orchestrates what is referred to as the O-RAN Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides infrastructure management services (IMS) and deployment management services (DMS).

In the related art, an NRT RIC cannot be deployed independently without an SMO framework and can only support fault, configuration, accounting, performance and security (FCAPS) through the SMO internal interface as shown in FIG. 2. There is no O1 termination or direct O1 connection from the NRT RIC framework to the Network Elements (NEs) for FCAPS operations. Further, in the related art, the NRT RIC cannot be deployed independently without the SMO framework and can only support O-Cloud management and orchestration through the SMO internal interface as shown in FIG. 2. There is no O2 termination or direct O2 connection from the NRT RIC framework to the cloud infrastructure hosting the NEs. In many cases, this leads to unnecessary platform implementation complexity and performance overhead, as well as causing a barrier to entry for new market players.

SUMMARY

According to embodiments, systems and methods are provided for implementing a policy for network elements (NEs).

According to an aspect of the disclosure, a method, performed by a non-real-time (NRT) radio access network (RAN) Intelligent Controller (RIC) within a Service Management and Orchestration (SMO) framework of an open-RAN (O-RAN) network, may include obtaining, by the NRT RIC, fault, configuration, accounting, performance and security (FCAPS) related information via an O1 connection from at least one NE in the O-RAN network, and implementing, by the NRT RIC, at least one first FCAPS related operation corresponding to the FCAPS related information for the at least one NE via the O1 connection, where the O1 connection includes an interface between the at least one NE and an O1 termination of the NRT RIC.

According to an aspect of the disclosure, a system implemented in a telecommunications network may include a memory storing instructions, and a processor configured to execute the instructions to obtain, by an NRT RIC within an SMO framework of an O-RAN network, FCAPS related information via an O1 connection from at least one NE connected to the O-RAN network, and implement, by the NRT RIC, at least one first FCAPS related operation corresponding to the FCAPS related information for the at least one NE via the O1 connection, where the O1 connection includes an interface between the at least one NE and an O1 termination of the NRT RIC.

According to an aspect of the disclosure, a non-transitory, computer-readable storage medium may store instructions that, when executed by at least one processor, cause the at least one processor to obtain, by an NRT RIC within an SMO framework of an O-RAN network, FCAPS related information via an O1 connection from at least one NE connected to the O-RAN network, and implement, by the NRT RIC, at least one first FCAPS related operation corresponding to the FCAPS related information for the at least one NE via the O1 connection, where the O1 connection includes an interface between the at least one NE and an O1 termination of the NRT RIC.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments provide systems, methods, networks, and devices that allow a non-real-time (NRT) radio access network (RAN) Intelligent Controller (RIC) to work independently to the Service Management and Orchestration (SMO) operation, administration, and maintenance (OAM) functions and support fault, configuration, accounting, performance and security (FCAPS) operations via the direct O1 connections with Network Elements (NEs). This greatly reduces the platform complexity and performance overhead, while reducing or removing the barrier to entry for new market players. According to example embodiments, operators are given an option where they may deploy light weight NRT RICs without the SMO infrastructure or with lighter weight SMO implementations for capital expenditure (CAPEX) reduction. SMO OAM functions are provided with 3rd party rApps in the NRT RIC with diversified vendor and solution selections and potentially with advanced artificial intelligence (AI)/machine learning (ML) technologies. Moreover, smaller vendors or new market players may also benefit by reducing or removing the barriers to entry from the implementation cost of the legacy SMO functions. Application programming interface (API) implementation, integration and interoperability test efforts from integrating the NRT RIC framework with an existing SMO framework is also greatly reduced due to the removal of the dependency on the existing SMO OAM and O1 related functions.

Example embodiments provide systems, methods, networks, and devices that allow a NRT RIC to work independently from the SMO open-RAN (O-RAN) Cloud (O-Cloud) related functions and support O-Cloud management, orchestration and workflow management functions via the direct O2 connections with NEs. This greatly reduces the platform complexity and performance overhead, while reducing or removing the barrier to entry for new market players. According to example embodiments, operators are given an option where they may deploy light weight NRT RICs without the SMO infrastructure or with lighter weight SMO implementations for CAPEX reduction. Conventional SMO O-cloud management and orchestration functions are provided with 3rd party rApps in the NRT RIC with diversified vendor and solution selections and potentially with advanced AI/ML technologies. Moreover, small vendors or new market players may also benefit by reducing or removing the barriers to entry from the implementation cost of the legacy SMO functions. API implementation, integration and interoperability test efforts from integrating the NRT RIC framework with an existing SMO framework is also greatly reduced due to the removal of the dependency on the existing SMO cloud and O2 related functions.

An O1 interface may refer to an interface that connects the SMO to RAN managed elements (e.g., near-real-time (nRT) RIC, O-RAN Centralized Unit (O-CU), O-RAN Distributed Unit (O-DU), etc.) or NEs external to the SMO. An O2 interface may refer to an interface between the SMO and the O-Cloud in which it resides, or an interface between an SMO and an external O-Cloud infrastructure. Through the O2 interface, the SMO provides infrastructure management services (IMS) and deployment management services (DMS).

Accordingly, provided are systems and methods including operations that may be performed by an NRT RIC within an SMO framework of O-RAN network. The operations may include obtaining, by the NRT RIC, at least one FCAPS related data/information corresponding to an FCAPS operation for at least one NE connected to the O-RAN network, and implementing, by the NRT RIC, at least one first FCAPS related operation corresponding to the OAM function for the at least one NE via an O1 connection. The O1 connection may include an interface between the at least one NE and an O1 termination of the NRT RIC. The O1 termination may be in the NRT RIC framework of the NRT RIC. Operations may further include obtaining, by the NRT RIC, at least one second data/information corresponding to an O-Cloud function, and implementing, by the NRT RIC, the at least one second cloud orchestration and management operation corresponding to the O-Cloud function via an O2 connection. The O2 connection may include an interface between an O-Cloud infrastructure and an O2 termination of the NRT RIC. The O2 termination may be in the NRT RIC framework of the NRT RIC. The NRT RIC may include a policy manager configured to implement the at least one first policy. The NRT RIC may include an NRT RIC framework separate from the policy manager.

Figure 4:
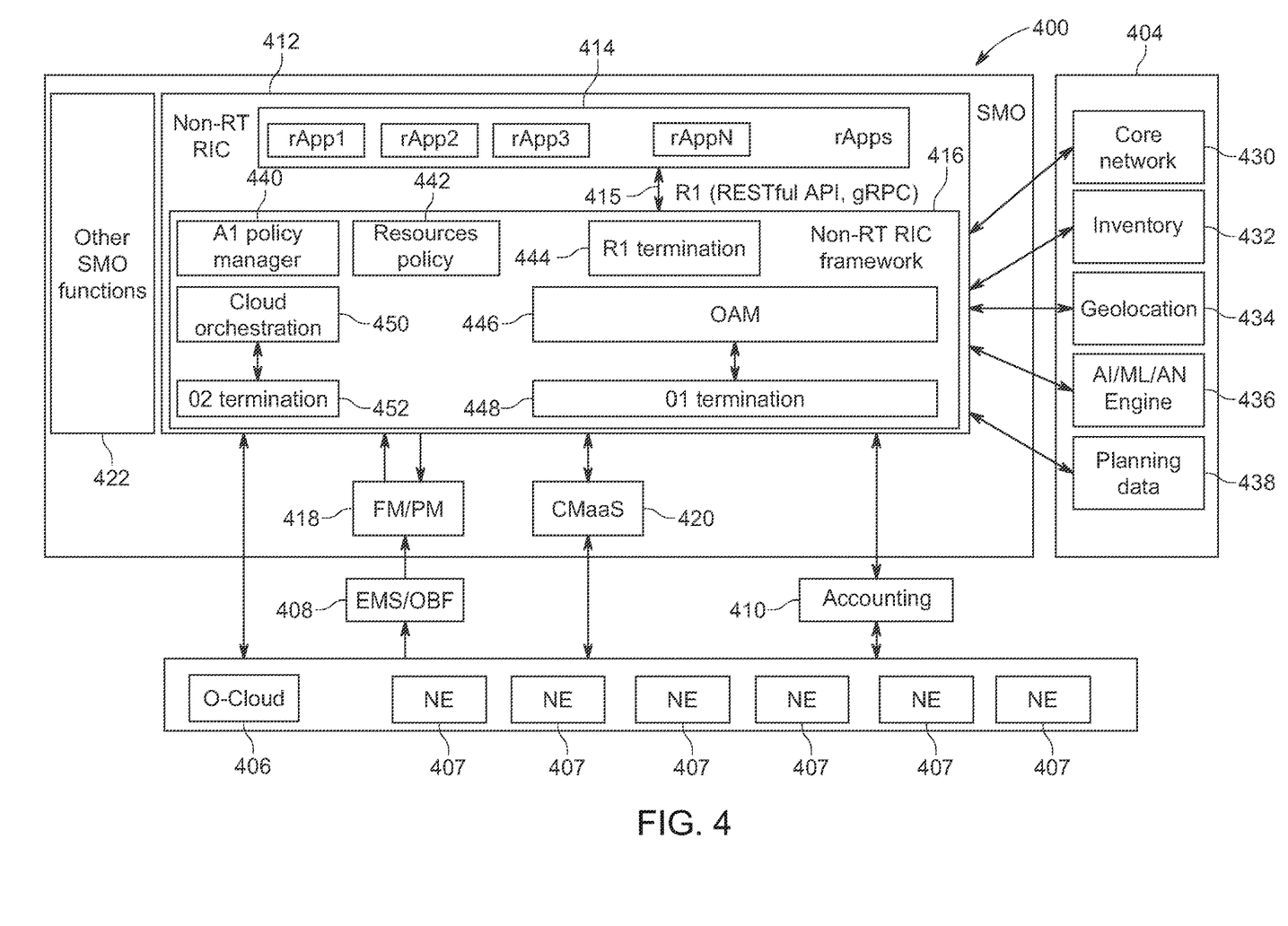
FIG. 4 is a diagram of an O-RAN architecture, according to an embodiment.

FIG. 4 is a diagram of an O-RAN architecture 400, according to an embodiment. The O-RAN architecture 400 may include an SMO 402, external data accesses 404, an O-cloud NE 406, other NEs 407, an element management system (EMS)/observability framework (OBF) module 408, and an accounting module 410. The SMO 402 may include an NRT RIC 412, including a plurality of rApps 414 (e.g., rApp1, . . . , rAppN), an R1 interface 415, and an NRT RIC framework 416, a fault management (FM)/performance management (PM) module 418, a cloud management as a service (CMaaS) module 420, as well as other SMO functions 422 as will be understood by one of ordinary skill in the art from the disclosure herein. The NRT RIC 412 may be configured to access the external data accesses 404, including a core network 430, an inventory database 432, a geolocation database 434, an external AI/ML/autonomous network (AN) engines 436, and a planning database 438. The NRT RIC framework 416 may include a policy manager 440, a resource policy 442, an R1 termination 444, an OAM component 446, an O1 termination 448, a cloud orchestration module 450, and an O2 termination 452.

As shown in FIG. 4, the NRT RIC 412 may implement the OAM functions 446 and O1 termination 448 for FCAPS operation with the NEs. In an example embodiment, the OAM functions and O1 termination 448 in the SMO 402 may be implemented within the NRT RIC framework 416 to support FCAPS operations. The NRT RIC 412 may be independently deployed without the SMO infrastructure 402. The OAM and FCAPS functions may be either supported by the OAM component 446 in the NRT RIC framework 416, or may be provided by rApps 414 with $3^{rd}$ party implementations. In an example embodiment, the SMO 402 and the NRT RIC 412 may be deployed together and may both support FCAPS operations with NEs in a collaborated way.

In an example embodiment, the OAM functions may implemented by the NRT RIC 412 as native implementations in the NRT RIC framework 416, providing support for O-RAN network function FCAPS via the O1 termination 448. The following FCAPS functions defined in the O1 specification are examples of the functionality across the O1 interface: PM, FM, configuration management (CM), file management, communications surveillance (e.g., heartbeat), trace, physical network function (PNF) discovery, PNF software management, etc. The OAM component 446 may operate independently, supporting full FCAPS operations without support from and interaction with any 3rd party rApp. The OAM component 446 may operate in cooperation with the rApps 414 delivering the same or different FCAPS services.

The rApps 414 may independently or partially provide O-RAN network function FCAPS via the O1 termination 448. The R1 interface 415 may include a collection of services, hereafter referred to as R1 services that facilitate the interactions between rApps 414 and the NRT RIC framework 416. The rApps 414 may support FCAPS operations through the O1 related services provided by the R1 interface 415. If rApps 414 provide full support of the FCAPS functions, the native FCAPS implementation in the NRT RIC framework 416 may be excluded.

The rApps 414 and native OAM implementation in the NRT RIC framework 416 may operate together to provide a single FCAPS service via the O1 termination 448. In this case, the functionality and responsibility may be separated and negotiated between the rApps 414 and the native OAM at the service registration stage. The rApps 414 may support or enhance native OAM operations by providing policy guidance or the rApps 414 may directly conduct FCAPS operations in parallel with the native OAM. The NRT RIC 412 may provide the conflict management service to resolve potential configuration and control conflicts among the rApps 414 and between the rApps 414 and the NRT RIC 412 native OAM functions.

Figure 5:
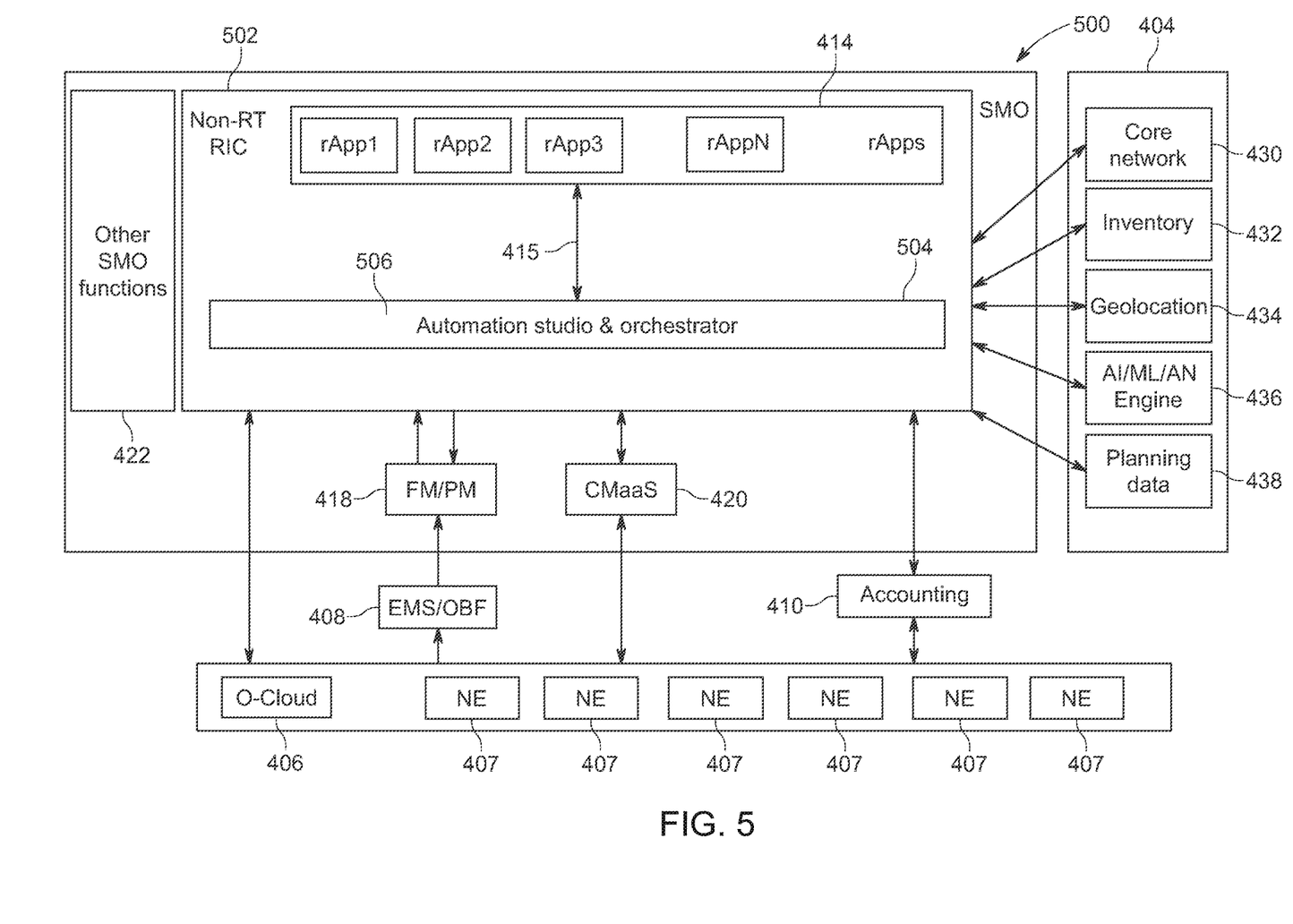
FIG. 5 is a diagram of an O-RAN architecture, according to an embodiment.

FIG. 5 is a diagram of an O-RAN architecture 500, according to an embodiment. The architecture 500 of FIG. 5 is similar to the architecture 400 of FIG. 4, however, the NRT RIC 502 may include an NRT RIC framework 504 implementing a solution automation studio configured to automate the action to the sound bound interface (e.g., O1/O2) by using the cross-link interface (CLI) or the simple scripts. The framework 504 may prepare the default responses based on the FCAPS information received, in the architecture 500. The NRT RIC 502 may utilize this framework 504 in order to automate and provide the faster response to the south bound interface (i.e., the interface toward the south of or below the NRT RIC). The default policies of the framework 504 may be updated by the NRT RIC 502 based on an AI/ML leaning process or by the direct configuration by the rApps 414.

In the embodiment shown in FIG. 5, NRT RIC framework 504 functions including the OAM/FCAPS functions and the O1 termination may be implemented and integrated in the automation studio and orchestrator 506, providing support for O-RAN network function FCAPS via the O1 interface. The R1 interface 415 may include a collection of services, hereafter referred to as R1 services that facilitate the interactions between rApps 414 and the automation studio and orchestrator 506. Service/responsibility negotiation and conflict management functionalities may be provided by the automation studio and orchestrator 506 for service coordination between the rApps 414 and the platform native OAM implementations.

Figure 6:
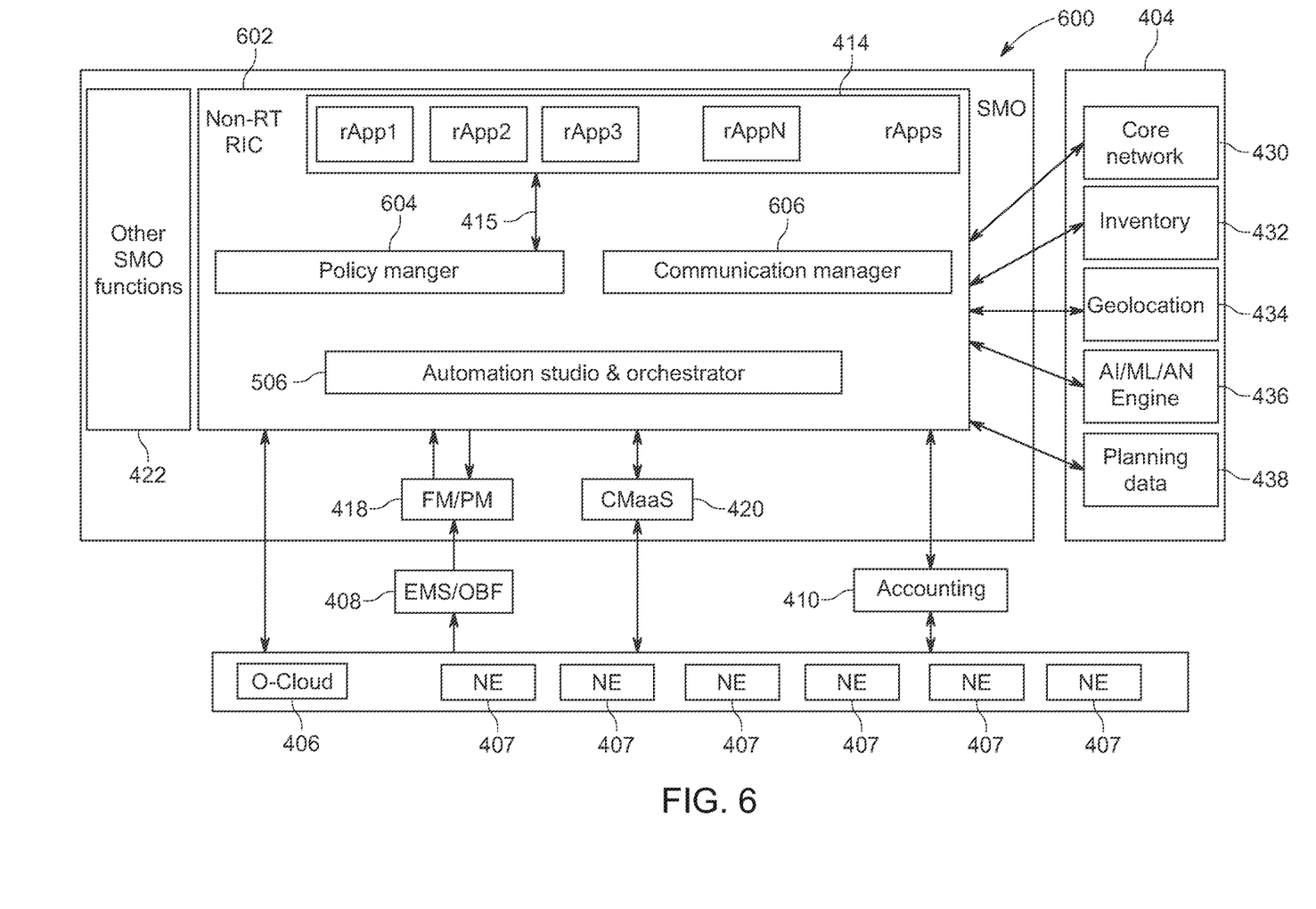
FIG. 6 is a diagram of an O-RAN architecture, according to an embodiment.

FIG. 6 is a diagram of an O-RAN architecture 600, according to an embodiment. The architecture 600 of FIG. 6 is similar to the architecture 500 of FIG. 5, and the NRT RIC 602 further includes a separate policy manager 604 and communication manager 606. The R1 interface 415 is configured to provide interaction between the rApps 414 and the communication manager 606. The policy manager 604 may provide more default policies which may be executed on top of the automation studio and orchestrator 506. The communication manager 606 may be configured to manage the communication among different modules. The R1 interface 415 may include a collection of R1 services that facilitate the interactions between the rApps 414 and the policy manger 604. Service/responsibility negotiation and conflict management functionalities may be provided by the policy manager 604 for service coordination between the rApps 414 and the platform native OAM implementations.

In the embodiments illustrated in FIGS. 4-6, the rApps 414 may access the data from the network interface to the core network through newly defined core related services provided by the R1 interface 415. If rApps 414 provide support of the core control functions, the functionalities and responsibility may be separated and negotiated between the rApps 414 and the native control function in the core network at the service registration stage. The rApps 414 may support or enhance native core control operation by providing policy guidance or the rApps 414 may directly configure or control core network in parallel with the native control functions. Conflict management may be implemented in the NRT RIC 412, 502 and 602 to resolve potential configuration and control conflicts between the rApps and the native control functions. Priority and privilege may be assigned by the operators or vendors to guide the conflict management process, giving priorities to the configuration and control commands from different resources.

Referring back to FIG. 4, the NRT RIC 412 may implement cloud orchestration functions of the cloud orchestration module 450 and O2 termination for O-Cloud management, orchestration and workflow management. The cloud orchestration functions of the cloud orchestration module 450 and O2 termination 452 may be implemented inside the NRT RIC framework 416. The NRT RIC 412 may be independently deployed without the conventional SMO infrastructure. The cloud orchestration functions of the cloud orchestration module 450 may be supported in the NRT RIC framework 416, or may be provided by the rApps 414 with 3rd party implementations. In one embodiment, the SMO 402 and the NRT RIC 412 may be deployed together and both may support cloud orchestration functions in a collaborated way. Further, when orchestration functionalities are outside the NRT RIC 412, the NRT RIC 412 may provide the policies to configure orchestration.

The cloud orchestration functions of the cloud orchestration module 450 may be implemented by NRT RIC platform vendors as native functions in the NRT RIC framework 416 which may work independently without support from and interaction with any 3rd party rApp or may work in cooperation with the rApps delivering the same or different O-Cloud management and orchestration service.

In some embodiments, the rApps 414 may independently or partially provide O-Cloud management and orchestration functions through the O2 related services provided by the R1 interface 415. If the rApps 414 provide full support of the O-Cloud management and orchestration functions of the cloud orchestration module 450, the native cloud orchestration module 450 implementation in the NRT RIC framework 416 may be excluded.

In some embodiments, the rApps 414 and the cloud orchestration module 450 in the NRT RIC framework 416 may work together to provide a single O-Cloud management and orchestration service via the O2 termination 452. In this case, the functionality and responsibility may be separated and negotiated between the rApps 414 and the cloud orchestration module 450 at the service registration stage. The rApps 414 may support or enhance the cloud orchestration module 450 operations by providing policy guidance or the rApps 414 may directly configure and control the O-Cloud infrastructure in parallel with the cloud orchestration module 450. Conflict management may be needed in the NRT RIC 412 to resolve potential configuration and control conflicts between the rApps 414 and the cloud orchestration module 450. Priority and privilege may be assigned by the operators or vendors to guide the conflict management process, assigning priorities to the configuration and control commands from different resources.

Referring back to FIG. 5, the NRT RIC framework 504 may implement an automation studio and orchestrator 506 which automates the action to the south bound interface (e.g., O1/O2) by using the CLI or the simple scripts. The automation studio and orchestrator 506 may prepare the default responses based on the FCAPS information received. The NRT RIC 502 may utilize this framework in order to automate and provide the faster response to the south bound interface. The default polies of this interface may be updated by the NRT RIC 502 based on the AI/ML leaning or by the direct configuration by the rApps 414. The rApps 414 may also support O-cloud management and orchestration operations (fully or partially) through the O2 related services provided by the R1 interface 415. Service/responsibility negotiation and conflict management functionalities may be provided by the automation studio and orchestrator 506 for service coordination.

Referring back to FIG. 6, the NRT RIC 602 may use the policy manager 604, and the policy manager 604 may provide more default policies which may be executed on top the automation studio. The communication manager 606 may manage the communication among different modules. The NRT RIC framework functions, including the O-Cloud management and orchestration functions and O2 termination may be implemented and integrated in the policy manager 604. The rApps 414 may also support O-Cloud management and orchestration operations (fully or partially) through the O2 related services provided by the R1 interface 415. Service/responsibility negotiation and conflict management functionalities may be provided by the policy manager.

Figure 7:
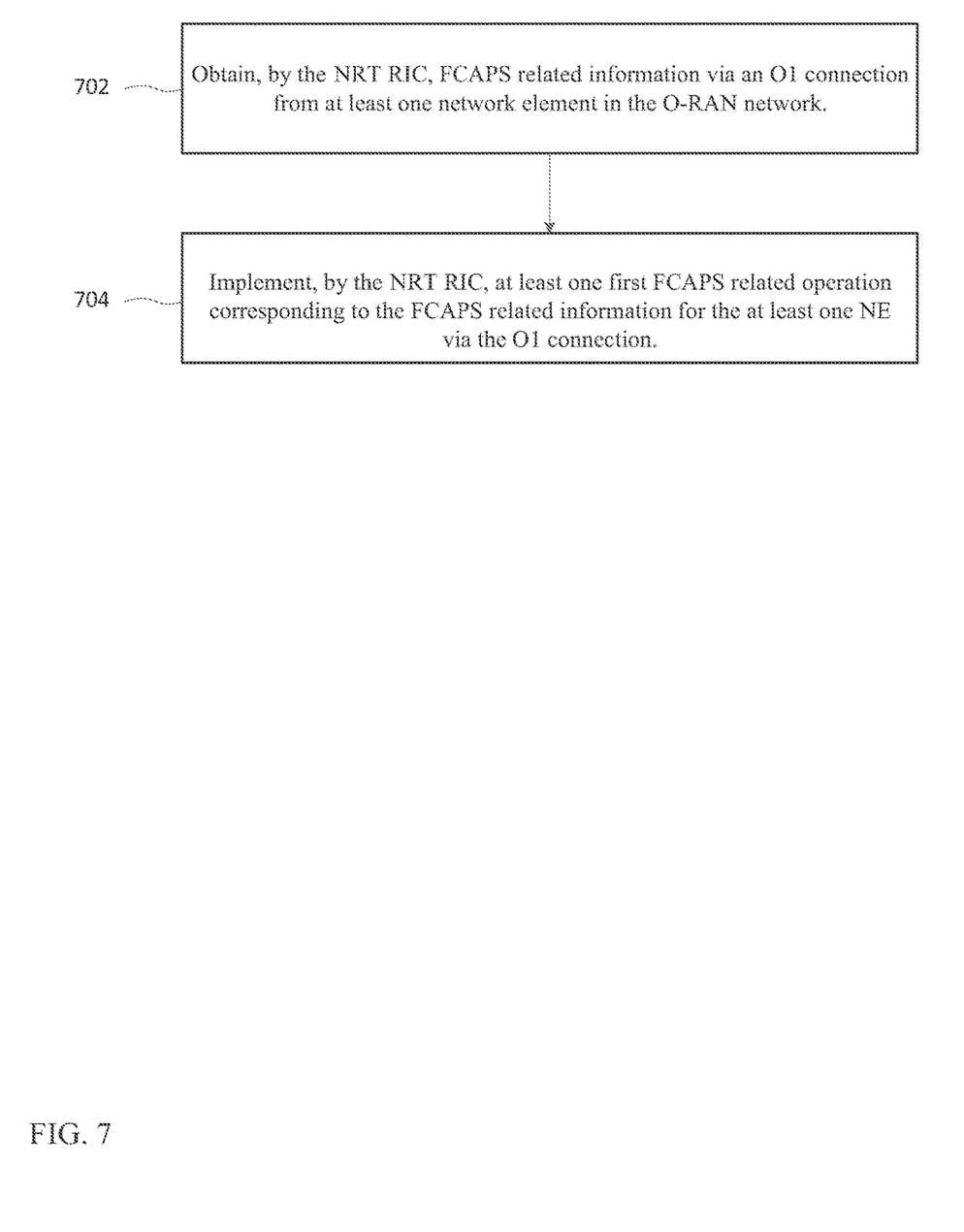
FIG. 7 is a flowchart of policy implementation with at least one network element (NE), according to an embodiment.

FIG. 7 is a flowchart of policy implementation with at least one NE, according to an embodiment. In operation 702, the system may obtain, by the NRT RIC, FCAPS related information via an O1 connection from at least one network element NE in the O-RAN network. In operation 704, the system may implement, by the NRT RIC, by the NRT RIC, at least one first FCAPS related operation corresponding to the FCAPS related information for the at least one NE via the O1 connection. The O1 connection may include an interface between the at least one NE and an O1 termination of the NRT RIC.

Figure 8:
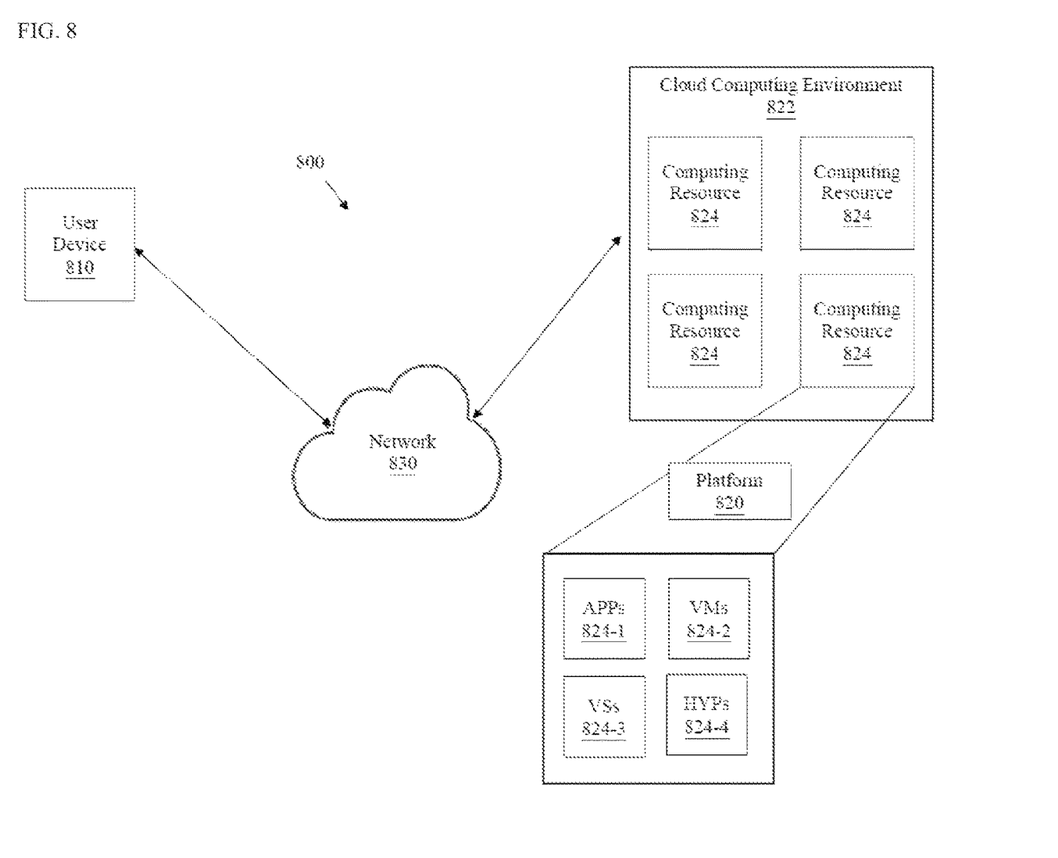
FIG. 8 is a diagram of an example environment in which systems and/or methods, described herein, may be implemented, according to an embodiment.

FIG. 8 is a diagram of an example environment 800 in which systems and/or methods, described herein, may be implemented. As shown in FIG. 8, environment 800 may include a user device 810, a platform 820, and a network 830. Devices of environment 800 may interconnect via wired connections, wireless connections, or a combination of wired and wireless connections. In embodiments, any of the functions and operations described with reference to FIG. 8 above may be performed by any combination of elements illustrated in FIG. 8.

User device 810 includes one or more devices capable of receiving, generating, storing, processing, and/or providing information associated with platform 820. For example, user device 810 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 810 may receive information from and/or transmit information to platform 820.

Platform 820 includes one or more devices capable of receiving, generating, storing, processing, and/or providing information. In some implementations, platform 820 may include a cloud server or a group of cloud servers. In some implementations, platform 820 may be designed to be modular such that certain software components may be swapped in or out depending on a particular need. As such, platform 820 may be easily and/or quickly reconfigured for different uses.

In some implementations, as shown, platform 820 may be hosted in cloud computing environment 822. Notably, while implementations described herein describe platform 820 as being hosted in cloud computing environment 822, in some implementations, platform 820 may not be cloud-based (i.e., may be implemented outside of a cloud computing environment) or may be partially cloud-based.

Cloud computing environment 822 includes an environment that hosts platform 820. Cloud computing environment 822 may provide computation, software, data access, storage, etc. services that do not require end-user (e.g., user device 810) knowledge of a physical location and configuration of system(s) and/or device(s) that hosts platform 820.

As shown, cloud computing environment 822 may include a group of computing resources 824 (referred to collectively as "computing resources 824" and individually as "computing resource 824").

Computing resource 824 includes one or more personal computers, a cluster of computing devices, workstation computers, server devices, or other types of computation and/or communication devices. In some implementations, computing resource 824 may host platform 820. The cloud resources may include compute instances executing in computing resource 824, storage devices provided in computing resource 824, data transfer devices provided by computing resource 824, etc. In some implementations, computing resource 824 may communicate with other computing resources 824 via wired connections, wireless connections, or a combination of wired and wireless connections.

As further shown in FIG. 8, computing resource 824 includes a group of cloud resources, such as one or more applications ("APPs") 824-1, one or more virtual machines ("VMs") 824-2, virtualized storage ("VSs") 824-3, one or more hypervisors ("HYPs") 824-4, or the like.

Application 824-1 includes one or more software applications that may be provided to or accessed by user device 810. Application 824-1 may eliminate a need to install and execute the software applications on user device 810. For example, application 824-1 may include software associated with platform 820 and/or any other software capable of being provided via cloud computing environment 822. In some implementations, one application 824-1 may send/receive information to/from one or more other applications 824-1, via virtual machine 824-2.

Virtual machine 824-2 includes a software implementation of a machine (e.g., a computer) that executes programs like a physical machine. Virtual machine 824-2 may be either a system virtual machine or a process virtual machine, depending upon use and degree of correspondence to any real machine by virtual machine 824-2. A system virtual machine may provide a complete system platform that supports execution of a complete operating system ("OS"). A process virtual machine may execute a single program, and may support a single process. In some implementations, virtual machine 824-2 may execute on behalf of a user (e.g., user device 810), and may manage infrastructure of cloud computing environment 822, such as data management, synchronization, or long-duration data transfers.

Virtualized storage 824-3 includes one or more storage systems and/or one or more devices that use virtualization techniques within the storage systems or devices of computing resource 824. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 824-4 may provide hardware virtualization techniques that allow multiple operating systems (e.g., "guest operating systems") to execute concurrently on a host computer, such as computing resource 824. Hypervisor 824-4 may present a virtual operating platform to the guest operating systems, and may manage the execution of the guest operating systems. Multiple instances of a variety of operating systems may share virtualized hardware resources.

Network 830 includes one or more wired and/or wireless networks. For example, network 830 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of environment 800 may perform one or more functions described as being performed by another set of devices of environment 800.

Figure 9:
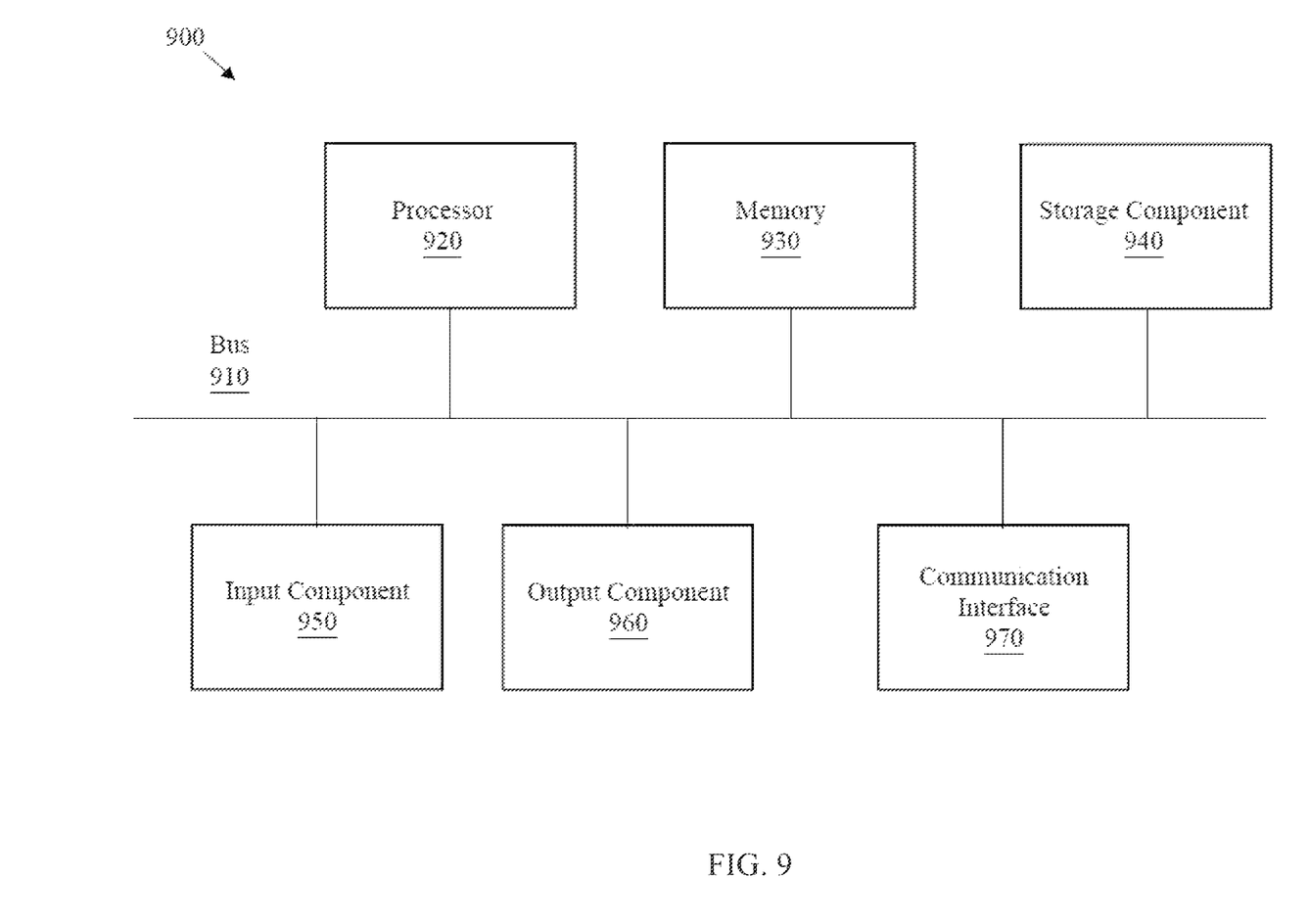
FIG. 9 is a diagram of example components of a device according to an embodiment.

FIG. 9 is a diagram of example components of a device 900. Device 900 may correspond to user device 810 and/or platform 820. As shown in FIG. 9, device 900 may include a bus 910, a processor 920, a memory 930, a storage component 940, an input component 950, an output component 960, and a communication interface 970.

Bus 910 includes a component that permits communication among the components of device 900. Processor 920 may be implemented in hardware, firmware, or a combination of hardware and software. Processor 920 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 920 includes one or more processors capable of being programmed to perform a function. Memory 930 includes a random access memory (RAM), a read only memory (ROM), and/or another type of dynamic or static storage device (e.g., a flash memory, a magnetic memory, and/or an optical memory) that stores information and/or instructions for use by processor 920.

Storage component 940 stores information and/or software related to the operation and use of device 900. For example, storage component 940 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 950 includes a component that permits device 900 to receive information, such as via user input (e.g., a touch screen display, a keyboard, a keypad, a mouse, a button, a switch, and/or a microphone). Additionally, or alternatively, input component 950 may include a sensor for sensing information (e.g., a global positioning system (GPS) component, an accelerometer, a gyroscope, and/or an actuator). Output component 960 includes a component that provides output information from device 900 (e.g., a display, a speaker, and/or one or more light-emitting diodes (LEDs)).

Communication interface 970 includes a transceiver-like component (e.g., a transceiver and/or a separate receiver and transmitter) that enables device 900 to communicate with other devices, such as via a wired connection, a wireless connection, or a combination of wired and wireless connections. Communication interface 970 may permit device 900 to receive information from another device and/or provide information to another device. For example, communication interface 970 may include an Ethernet interface, an optical interface, a coaxial interface, an infrared interface, a radio frequency (RF) interface, a universal serial bus (USB) interface, a Wi-Fi interface, a cellular network interface, or the like.

Device 900 may perform one or more processes described herein. Device 900 may perform these processes in response to processor 920 executing software instructions stored by a non-transitory computer-readable medium, such as memory 930 and/or storage component 940. A computer-readable medium is defined herein as a non-transitory memory device. A memory device includes memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may cause processor 920 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 9 are provided as an example. In practice, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

In embodiments, any one of the operations or processes of FIGS. 4-7 may be implemented by or using any one of the elements illustrated in FIGS. 8 and 9. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method, performed by a non-real-time (NRT) radio access network (RAN) Intelligent Controller (RIC) within a Service Management and Orchestration (SMO) framework of an open-RAN (O-RAN) network, the method comprising:

obtaining, by the NRT RIC, fault, configuration, accounting, performance and security (FCAPS) related information via a connection from at least one network element (NE) in the O-RAN network, and implementing, by the NRT RIC, at least one first FCAPS related operation corresponding to the FCAPS related information for the at least one NE via the connection, wherein the connection comprises an interface between the at least one NE and a termination in the NRT RIC within the SMO.

2. The method of claim 1, wherein the connection is an O1 connection and the termination is an O1 termination in an NRT RIC framework of the NRT RIC.

3. The method of claim 1, further comprising:

obtaining, by the NRT RIC, at least one second FCAPS related operation corresponding to an O-RAN cloud (O-Cloud) function; and implementing, by the NRT RIC, the at least one second FCAPS related operation corresponding to the O-Cloud function via another connection.

4. The method of claim 3, wherein the other connection is an O2 connection that comprises an interface between O-Cloud infrastructure and an O2 termination of the NRT RIC.

5. The method of claim 4, wherein the O2 termination is in an NRT RIC framework of the NRT RIC.

6. The method of claim 1, wherein the NRT RIC comprises a policy manager configured to implement the at least one first FCAPS related operation.

7. The method of claim 6, wherein the NRT RIC comprises an NRT RIC framework separate from the policy manager.

8. A system implemented in a telecommunications network, the system comprising:

a memory storing instructions; and a processor configured to execute the instructions to:

obtain, by a non-real-time (NRT) radio access network (RAN) Intelligent Controller (RIC) within a Service Management and Orchestration (SMO) framework of an open-RAN (O-RAN) network, fault, configuration, accounting, performance and security (FCAPS) related information via a connection from at least one network element (NE) connected to the O-RAN network; and implement, by the NRT RIC, at least one first FCAPS related operation corresponding to the FCAPS related information for the at least one NE via the connection, wherein the connection comprises an interface between the at least one NE and a termination in the NRT RIC within the SMO.

9. The system of claim 8, wherein the connection is an O1 connection and the termination is an O1 termination in an NRT RIC framework of the NRT RIC.

10. The system of claim 8, wherein the processor is further configured to execute the instructions to:

obtain, by the NRT RIC, at least one second FCAPS related data corresponding to an O-RAN cloud (O-Cloud) function; and implement, by the NRT RIC, the at least one second FCAPS related operation corresponding to the O-Cloud function via another connection.

11. The system of claim 10, wherein the other connection is an O2 connection that comprises an interface between an O-Cloud infrastructure and an O2 termination of the NRT RIC.

12. The system of claim 11, wherein the O2 termination is in an NRT RIC framework of the NRT RIC.

13. The system of claim 8, wherein the NRT RIC comprises a policy manager configured to implement the at least one first FCAPS related operation.

14. The system of claim 13, wherein the NRT RIC comprises an NRT RIC framework separate from the policy manager.

15. A non-transitory, computer-readable storage medium storing instructions that, when executed by at least one processor, cause the at least one processor to:

obtain, by a non-real-time (NRT) radio access network (RAN) Intelligent Controller (RIC) within a Service Management and Orchestration (SMO) framework of an open-RAN (O-RAN) network, at least one first fault, configuration, accounting, performance and security (FCAPS) related operation via a connection from at least one network element (NE) in the O-RAN network; and implement, by the NRT RIC, at least one first FCAPS related operation corresponding to the FCAPS related information for the at least one NE via the connection, wherein the connection comprises an interface between the at least one NE and a termination in the NRT RIC within the SMO.

16. The storage medium of claim 15, wherein the connection is an O1 connection and the termination is an O1 termination in an NRT RIC framework of the NRT RIC.

17. The storage medium of claim 15, wherein the instructions, when executed, further cause the at least one processor to:

obtain, by the NRT RIC, at least one second FCAPS related operation corresponding to an O-RAN cloud (O-Cloud) function; and implement, by the NRT RIC, the at least one second FCAPS related operation corresponding to the O-Cloud function via another connection.

18. The storage medium of claim 17, wherein the other connection is an O2 connection that comprises an interface between O-Cloud infrastructure and an O2 termination of the NRT RIC.

19. The storage medium of claim 18, wherein the O2 termination is in an NRT RIC framework of the NRT RIC.

20. The storage medium of claim 15, wherein the NRT RIC comprises a policy manager configured to implement the at least one first FCAPS related operation.

* * * * *